United States Patent [19]

Geyer et al.

[11] Patent Number: 5,319,633
[45] Date of Patent: Jun. 7, 1994

[54] ENHANCED SERIAL NETWORK TOPOLOGY GENERATION ALGORITHM

[75] Inventors: Joel E. Geyer, Cary; Bradley S. Trubey, Raleigh; Anthony B. Walker, Durham, all of N.C.

[73] Assignee: International Business Machines Corporation, Armonk, N.Y.

[21] Appl. No.: 931,234

[22] Filed: Aug. 17, 1992

[51] Int. Cl.[5] .................. H04L 12/26; H04L 12/42
[52] U.S. Cl. .................................. 370/17; 370/92; 370/85.15; 340/825.52
[58] Field of Search .............. 370/13, 14, 16, 16.1, 370/17, 92, 93, 85.1, 85.15, 85.4, 85.13, 85.14, 60, 60.1, 94.1, 94.2, 94.3; 340/825.05, 825.06, 825.07, 825.08, 825.52, 825.53, 825.54, 827

[56] References Cited

U.S. PATENT DOCUMENTS

| | | | |
|---|---|---|---|
| 4,777,330 | 10/1988 | Nakayashiki et al. | 340/825.05 |
| 4,891,639 | 1/1990 | Nakamura | 340/825.07 |
| 5,049,873 | 9/1991 | Robins et al. | 340/825.07 |
| 5,079,765 | 1/1992 | Nakamura | 370/85.1 |
| 5,084,870 | 1/1992 | Hutchison et al. | 370/85.13 |
| 5,101,405 | 3/1992 | Bekki et al. | 340/825.05 |
| 5,157,658 | 10/1992 | Arai et al. | 340/825.07 |

Primary Examiner—Douglas W. Olms
Assistant Examiner—Hassan Kizou
Attorney, Agent, or Firm—Joscelyn G. Cockburn

[57] ABSTRACT

A network topology generator identifies addresses and locations of multiple stations connected to a single access port of a communications network by determining a pair of identifiable network units between which the multiple stations are connected, sequentially deactivating access ports between the pairs of identifiable network units and issuing selected message frames to the stations whose location is unknown. The message frames returning from said stations are monitored to detect the state of the Address Recognized (AR) bit. If the bit is set, this indicates that the station is still on the network. Therefore, the deactivate/polling routine is repeated until the AR bit in a returned message is in an "off" state, indicating that the station is not on the network and is connected to the last deactivated port.

10 Claims, 10 Drawing Sheets

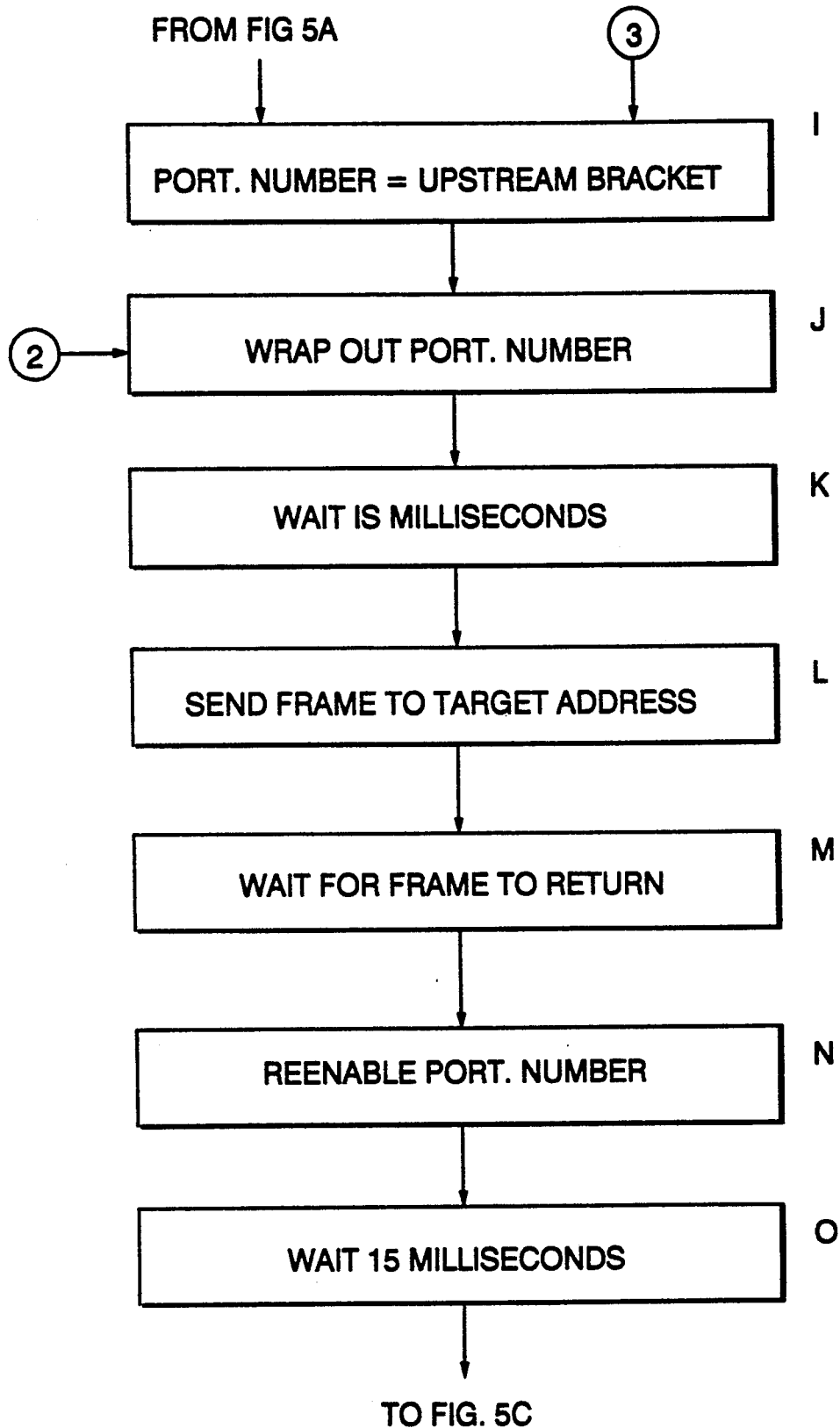

FIG. 8

| START DE-LIMITER | PHYSICAL CONTROL FIELD | DESTIN-ATION ADDRESS | SOURCE ADDRESS | INFORMATION FIELD | FRAME CHECK SEQU. | ENDING DE-LIMITER | PHYSICAL CTRL. FIELD EXTENSION |

ENHANCED SERIAL NETWORK TOPOLOGY GENERATION ALGORITHM

BACKGROUND OF THE INVENTION

U.S. patent application Ser. No. 07/630,720 (hereinafter called Serial Network Topology and Reconfiguration Generator) filed Dec. 20, 1990, and assigned to the same assignee as the present invention, discloses a network topology generator which matches the address of active stations to the access port to which the stations are connected. Even though the Serial Network Topology and Reconfiguration Generator works well for its intended purpose, Applicants have discovered an improved generator which provides topology information on communications networks in which certain stations may not participate in a registration process or multiple stations are connected to a single port. The Serial Network Topology and Reconfiguration Generator and the improved Serial Network Topology Generator provide a total solution for the difficult task of mapping addressable units of a network to the access ports to which the addressable units are connected.

SUMMARY OF THE INVENTION

The invention contemplates a topology generator comprised of a pair of addressable network entities (adapters) which interconnect the topology generator to serial taps on a serial transmission media. A plurality of addressable access ports are disposed between the addressable adapters. Each of the addressable access ports couples single or multiple stations to the serial transmission media. A programmable processor in the topology generator monitors configuration messages exchanged between a monitor station and all active stations on the network. The programmable processor generates a topology table containing addresses (station identifiers) and ports to which the stations are connected. If the number of active ports is not equal to the number of active stations, the processor sequentially deactivates the addressable access ports and issues messages with the address of the station whose location is being sought (hereafter called the target station) as the destination address. The processor also monitors the state of the Address Recognized (AR) bit in a returned frame. If the bit is in an "on" state, this is an indication that the targeted station is still on the network. The routine of deactivating a port and monitoring the AR bit is repeated until a frame with the AR bit in an "off" state is received. The microprocessor associates the target station with the last deactivated port and updates the topology table accordingly.

BRIEF DESCRIPTION OF THE DRAWINGS

FIGS. 5A, 5B and 5C show a detailed flowchart describing the present invention.

FIG. 8 shows a graphical representation of the Frame Format.

DETAILED DESCRIPTION OF THE PREFERRED EMBODIMENT

Figure 1:
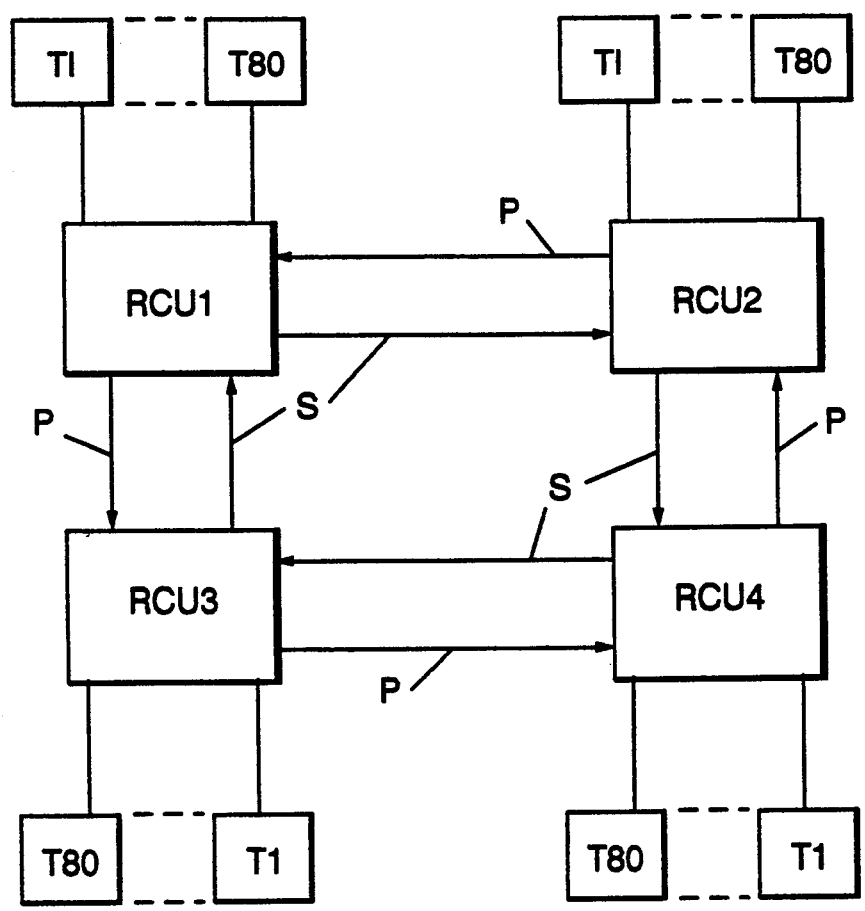
FIG. 1 is a block diagram of a dual ring network, including topology generators.

FIG. 1 shows a serial communications network embodying the teachings of the present invention. The communications network includes four reconfiguration and topology generation units, RCU1-RCU4. The units are interconnected by a primary ring "P" and a secondary ring "S". Each RCU contains multiple ports which attach stations T1 through Tn to the primary ring during normal or no fault operation. In the preferred embodiment of this invention, N is equal to 80. Of course, other values of N greater than or less than 80 are contemplated by the teachings of the present invention. When the stations are so connected, any device Ti can communicate with any other device Ti±A via the primary ring P, provided the other device is connected and operational.

In the event of a failure of a component or a link in the primary ring, the primary and secondary rings are reconfigured via switching networks in one or more RCUs to form a single ring over which all or some of the devices continue to communicate until the failed components are replaced or repaired. A detailed description of the reconfiguring process and devices is set forth in the above identified patent applications assigned to the assignee of the present invention, and is incorporated herein by reference. In view of the detailed description in the identified U.S. patent application, only those features and components of said application which are necessary to understand the teachings of the present invention are repeated below. Other detailed descriptions can be obtained from the incorporated patent application.

In addition to reconfiguring the network in the case of a failure condition, each RCU provides topology generation information about the network. The topology generation information allows a network management station to indicate the port to which a particular device is connected. This information is invaluable in maintaining the operation of a network. The capability of generating network information is also provided in the above identified U.S. application. However, in that application, the means to detect the presence of multiple stations on the same port and/or certain types of stations on the network is not provided.

Two different scenarios can lead to the problems addressed by this invention. The first scenario occurs when devices, known as splitters or Dual Terminal Access Units (DTAUs), are connected to a single port. The DTAU device allows multiple stations to participate in network protocol through a single physical port. this causes the topology generator to see more logical addresses on the network than active ports. The second scenario is the opposite of the DTAU problem, and is precipitated by stations on the network which do not participate in the so-called "neighbor notification" process. The neighbor notification (NN) process is a standard process mandated by the IEEE committee 802.5 on Token Ring, which provides the mechanism to notify a monitor station of the presence of all active stations on the network. Stations which do not participate in this protocol will cause the topology generator to detect more active ports than logical addresses on the network. Either or both of these scenarios, when occurring in a network such as the one described in FIG. 1, cause mismatches between the number of active stations and the number of active ports. The topology generated by the present invention identifies those ports, resulting in an actual and accurate topology of the network.

Figure 6:
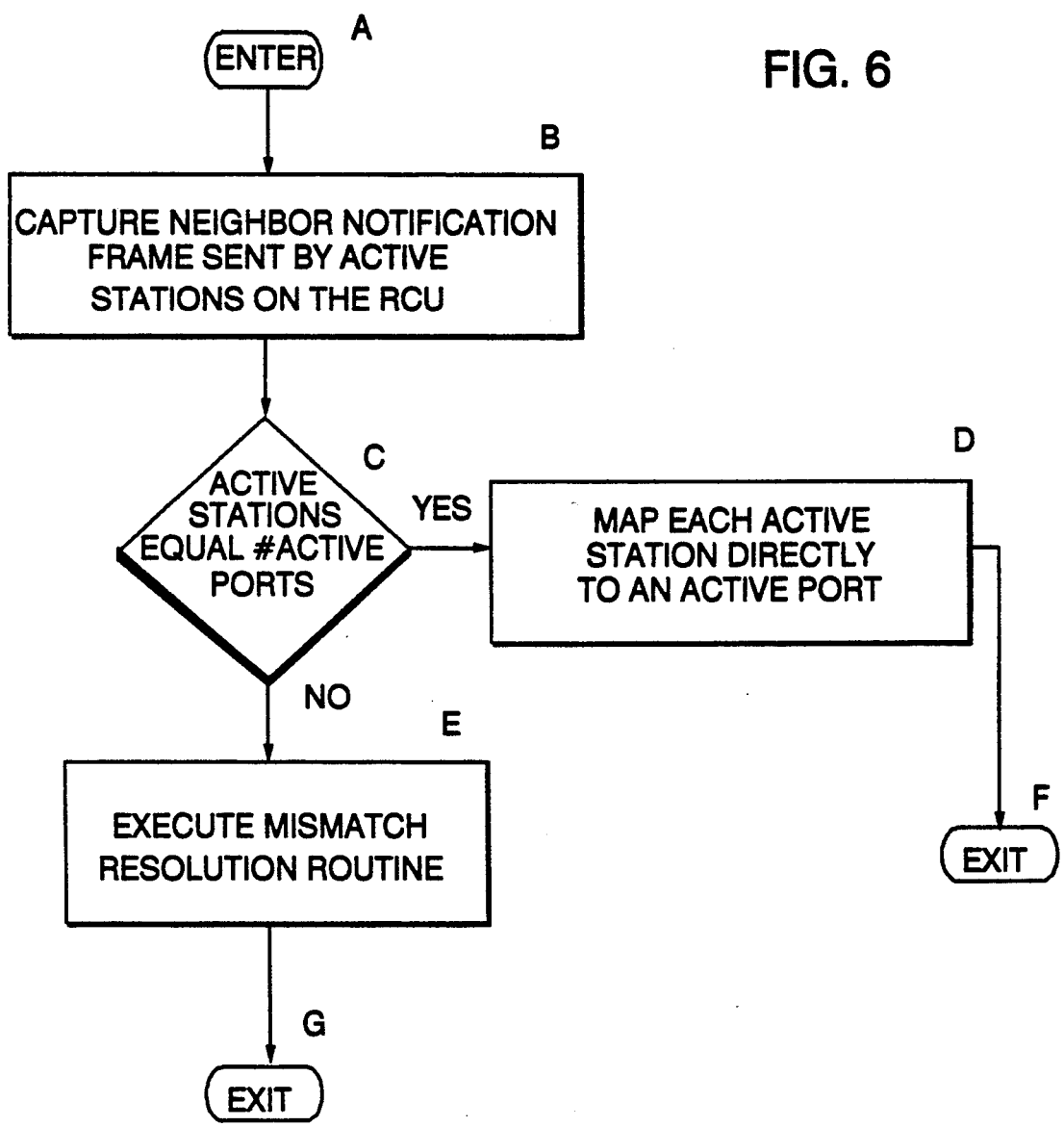
FIG. 6 shows a conceptual representation of the present invention.

Turning to FIG. 6 for the moment, a conceptual representation of the improved topology generator is provided in the form of a simple flowchart. Detailed descriptions of the hardware and other devices necessary to provide the improved topology generator are given below. Suffice it to say at this point that after the process begins (Block A), a controller in a reconfigurable unit (details are given below) captures and stores all neighbor notification frames sent out by active stations on the RCU (Block B). If the number of active ports matches the number of active stations (Block C), a configuration (Config) Table in which the Active Ports are matched with the Active Stations (Block D) is generated. The process for adding stations to the Config Table is straightforward and described in the above identified incorporated patent application. If the number of ports does not match the number of stations, the Mismatch Resolution routine (Block E) is executed. This routine isolates and identifies ports with multiple stations connected, as well as identifying the port number of stations not participating in the neighbor notification process. Heretofore, none of these ports could have been identified. The component and structures necessary for implementing the invention will now be described.

Figure 2:
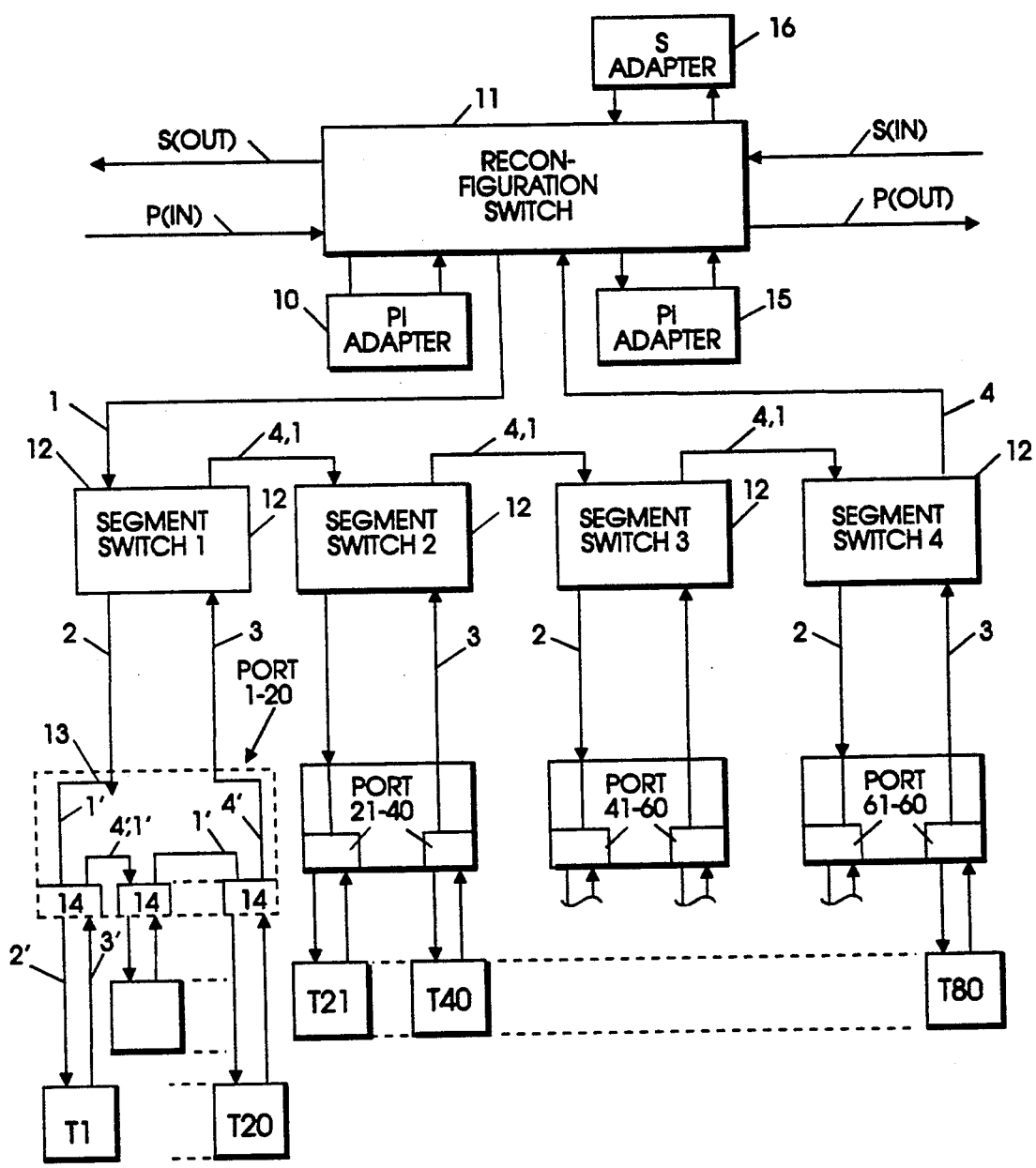
FIG. 2 is a block diagram of a topology generator unit, illustrating network information signal flow.
Figure 3:
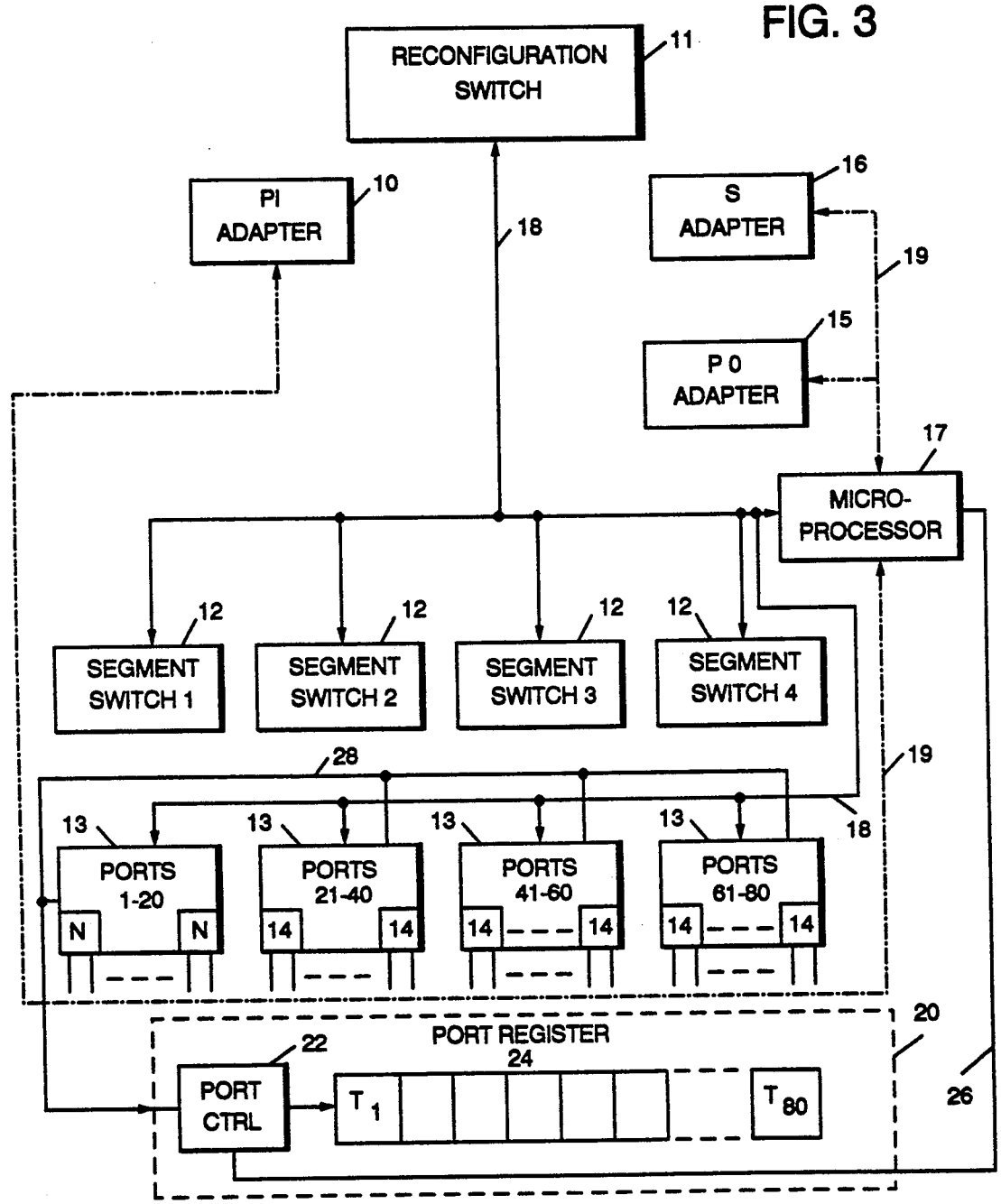
FIG. 3 is a block diagram illustrating internal communication of the topology generator.

FIGS. 2 and 3 are block diagrams of a single RCU. The other RCUs are identical. In FIG. 2, only information signals (or data) flow is illustrated, while FIG. 3 illustrates only internal communication among the various components of the RCU. The same reference numerals will be used for the corresponding components in both FIGS. 2 and 3.

A reconfiguration switch 11 is connected to the primary and secondary rings (P, S), through adapters 10, 15, and 16, and four serially connected segment switches 12 connect eighty ports. Switch 11 can be in any one of the switching states illustrated in FIGS. 4A-4D, and interconnects the adapters and the ports served by the segment switches. A more detailed discussion of these states is set forth in the above identified incorporated patent applications. However, the generation of topology information is best related to the configuration shown in FIG. 4A, in which the PI adapter 10 is connected to the PO adapter 15 on primary ring P.

The information signals passed on by PI adapter 10 are applied to the first segment switch 12 via Reconfiguration Switch 11 over Conductor 1 (FIG. 2). Segment Switch 1 is a relay-operated multiple pole double throw switch, which in one position connects Conductor 1 to Conductor 2, and Conductor 3 to Conductor 4. In its alternate position, Conductor 1, is directly connected to Conductor 4, and Conductor 2 is connected to Conductor 3. The other segment switches provide the same interconnection to their respective lines as the interconnection provided by Segment Switch 1. It should be noted that the reconfiguration switch and port switches (to be described hereinafter) are identical to the segment switch.

Conductor 2 is connected to one input of a port module 13, which includes 20 ports to which a device such as station Ti can be connected. Each port is provided with a relay-operated multiple pole double throw switch 14 similar to Segment Switch 1, which in one state connects Conductor 1' to Conductor 2' and Conductor 3' to Conductor 4'. Conductor 4' of the first port is connected to Conductor 1' of the second port, and thus forms a series connection of all ports having switches in this state. Conductor 4' of the last port switch is connected to Conductor 3, which is connected to the Segment Switch 12.

If all of the ports are active (that is, all have active devices Ti connected), then all of the switches 14 are in the first state described, devices T1-T20 are connected in series, and the information signals passed on by PI Adapter 10 will pass serially through Devices T1-T20 and return to Segment Switch 1. The second, third, and fourth Segment Switches 12 and their associated ports and the connected device operate in a like manner.

Conductor 4 of the fourth segment switch is connected to the input of PO Adapter 15 through the Reconfiguration Switch 11, and the output of Adapter 15 is connected to the primary ring P(out).

In the normal mode, information signals arriving at P(in) are passed through PI Adapter 10, Segment Switch 1 and active connected devices T1-T20; thereafter, in series through the remaining segment switches 12 and active connected devices Ti associated therein, and then through PO Adapter 15 to Primary Ring P(out). In the normal mode, the components participating in signal transfer, such as PI Adapter 10, Segment Switch 1, etc. are connected in series.

In the normal mode, information signals in the secondary ring S pass directly through S Adapter 16 via the reconfiguration switch 11 to the output side of the ring. If all the RCUs (FIG. 1) are in this mode, the S ring carries no information signals from the devices T. In the other modes (FIGS. 4B-4D), information signals from devices Ti traverse portions of both the primary and secondary rings which have been reconfigured into a single ring. The reason for reconfiguring the ring in FIGS. 4B-4D is not necessary to understand the present invention and further description of those figures will not be given. However, detailed description of FIGS. 4B-4D are set forth in the above incorporated patent application and can be referenced if needed.

Referring to FIG. 3, segment switches 12 and port switches 14 are controlled by the microprocessor 17 via the solid line conductors 18. Adapters 10, 15, and 16 communicate with the microprocessor 17 over a bus 19, shown as a dashed line. Port Controller Means 20, comprised of the Port Controller 22 and Port Register 24, communicates over Conductor 26 to the microprocessor 17. Information about the conductive states of the port switches 14 is fed over Conductor 28 to the Port controller Means 20. Each position in Port Register 24 represents the state of one of the port switches 14, and can be placed into one of two states. Each state can be selected by Port Controller 22, reflecting the position of the corresponding switch. The state of the respective port switches in Port Register 24 is fed over Conductor 26 to the microprocessor 17. The use that the microprocessor 17 makes of the information is described subsequently.

Adapters 10, 15, and 16 may be substantially similar in construction and operation to the IBM 16/4 Token Ring Adapter/A, which is described in Token-Ring Network Adapter Technical Reference. This adapter attaches to the input/output bus of the IBM PC or compatible personal computer and interfaces to a token ring media. Information exchanges between the adapter and the PC are accomplished by a shared memory technique. In this technique, memory area within which each device may both read and write is provided on the adapter. The devices periodically check the memory to detect changes which result when one of the devices alters part or all the memory content. The portions of this memory area include a number of flag bits, each of which is defined as to meaning and function.

In a similar manner, Microprocessor 17 communicates with any one of the Adapter 10, 15, and 16. As mentioned above, the RCU reconfigures and generates topology information about the network. Since the present invention is primarily concerned with topology generation, the discussion relative to reconfiguration is limited and described only to the extent necessary to show its relationship with the present invention. With reference to FIGS. 4A–4D, different configuration scenarios are shown. As stated previously, FIG. 4A describes the normal situation in which communication is carried out on the primary ring P. The configurations shown in FIGS. 4B-4D occur when malfunctioning conditions, such as a media break, occur in either the primary or secondary communications media. When this occurs, the adapters, in conjunction with the microprocessor, reconfigure the ring so that communications between the stations on the closed path network can still transmit data.

It should be noted that, except for FIG. 4D, the eighty ports and their attached stations are bracketed by network addressable units, such as adapters PI 10 and PO 15. The arrangement of having the ports bracketed by the network addressable units together with the neighbor notification function (as set forth in the IEEE 802.5 Token Ring Standard) makes possible the correlation of the device identities and the ports to which the devices are connected. The neighbor notification function is implemented in IEEE 802.5 Token Ring and is briefly described below.

When the ring is first started or has recovered from a fault (which usually occurs when a device enters or leaves the ring), all of the devices enter a process known as "Active Monitor Contention". This process is used to select a single device on the ring to function as the Active Monitor. All devices assume the role of standby monitors.

Once the contention process is completed, the Active Monitor transmits an Active Monitor Present (AMP) frame. This frame includes a broadcast bit in the Destination Address field and its own address in the Source Address field. In addition, the frame includes an Address Recognized bit. Since the ring is serial, the active downstream station receives the frame (since it includes a broadcast address) before any other station. Because the Address Recognized bit has not yet been set, the receiving station knows that the source address of the frame corresponds to its Nearest Active Upstream Neighbor (NAUN). The receiving station stores this information, and sets the Address Recognized bit before retransmitting. As soon as this station is able to obtain a free token, it will transmit a Standby Monitor Present (SMP) frame. This frame (like the AMP frame) contains a source address, a destination address, and an Address Recognized bit, as well as some other information. Each active downstream device repeats the process described above.

The process repeats until the Active Monitor receives an SMP frame with an Address Recognized bit not set. At this time each active device on the ring has acquired the address of its NAUN and the neighbor notification process is completed. While this process has produced a logical mapping of the addresses of the stations attached to the token ring, it cannot correlate these addresses to physical locations or ports. To perform this correlation requires the teachings in the above identified patent application. Briefly stated, one of the Adapters 10 or 15 passes all neighbor notification messages received to the microprocessor 17. The microprocessor 17 is also provided with a list of all active ports on the RCU. Thus, the microprocessor 17 has both a sequential list of all stations (and their addresses) on the token ring and the status of each of its eighty ports. This information allows the microprocessor 17 to correlate device addresses with the physical ports active on the token ring. This correlation is deemed accurate if the number of addresses received equals the number of active ports. As stated above, whenever the number of active ports does not equal the number of addresses received, the Mismatch Resolutions process (FIG. 5, Block I-, Block U) is executed. This routine is capable of mapping multiple addresses to a single port, or mapping no addresses to a single port (in the event of a station, such as IBM's Trace and Performance Tool, which does not participate in the neighbor notification process). The details of the Mismatch Resolution routine are described below.

Once this information is obtained, it can be transmitted by the microprocessor 17 via one of the adapters (10, 15, 16) to a manager program such as the IBM LAN Network Manager Program residing in one of the devices. The Manager Program in this manner receives from all the RCUs precise topology information for the entire network. One of the outstanding advantages of the invention is the generation of this topology information with no changes to existing devices or addition of intelligent devices at each port.

In accordance with the IEEE 802.5 Standard, a device connected to a port must provide a DC signal, sometimes referred to as a Phantom Current, in order to connect to the network. This signal causes Port Switch 14 to insert the device, as well as sending a signal over Bus 18 (FIG. 3) to the microprocessor 17 indicating that the port is active. The DC current is provided as long as the station is active in the ring. Thus, the microprocessor 17 has sufficient information to maintain a table of active/inactive ports and stations connected to the ports.

Turning to FIG. 8 for the moment, the basic frame format for frames or messages is shown. The frame includes a Start Delimiter (SDEL) field, a Physical Control Field (containing the Address Recognized bit), destination address field, source address field, information field, frame check sequence field, ending delimiter field, and a physical control field extension. This frame format is used for shuttling information across the token ring network.

Referring again to FIG. 3, during the neighbor notification process, the microprocessor 17 builds a table which includes the identity of those stations bracketed by the addresses of the selected two of the three attached adapters (10, 15, 16), hereinafter called bracketing adapters. Under normal circumstances, the number of reporting stations will equal the number of active ports. Since the identities are provided sequentially, they can be readily correlated to a specific port at which they reside.

Figure 4A:
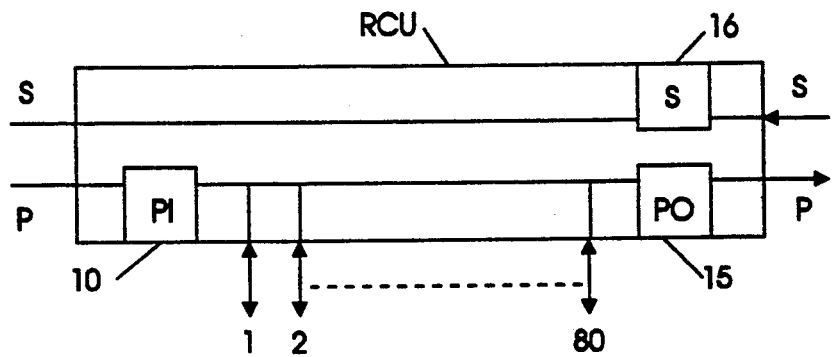
FIGS. 4A-4D illustrate the different switching states of the reconfiguration unit.
Figure 4B:
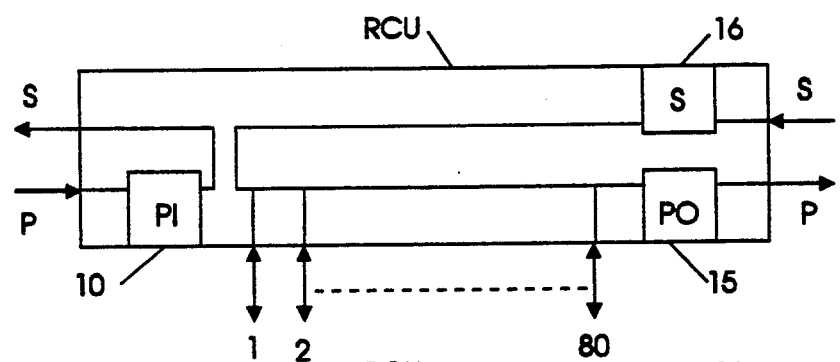
Figure 4C:
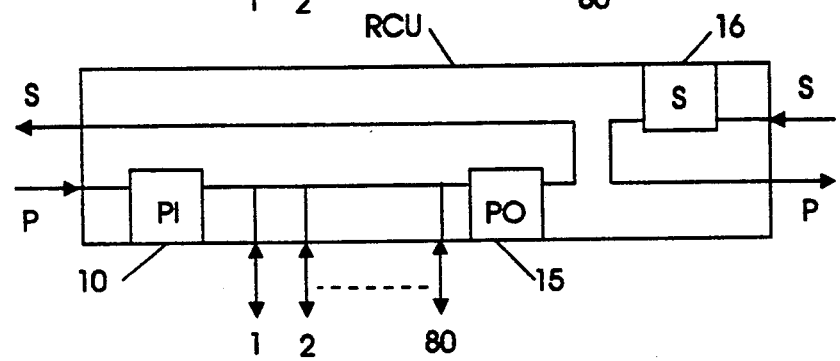
Figure 4D:
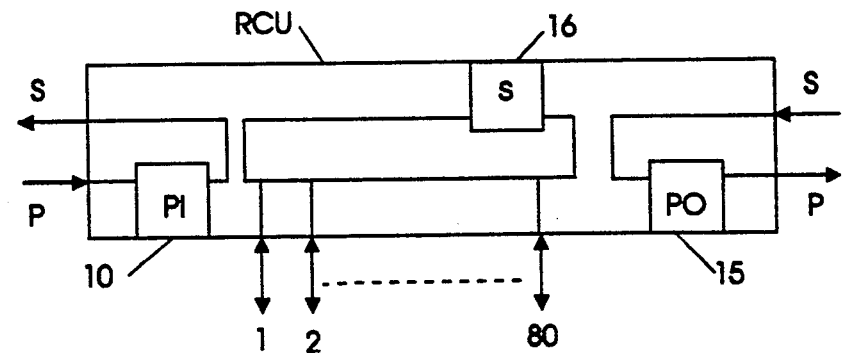

As can be seen from the above, the provision of the bracketed network addressable entities permits implementation of the topology generation under the configurations illustrated in FIGS. 4A-4C, and still provide for an adapter connected to the non-operative ring portion (FIGS. 4B and 4C) dedicated to recovery of fault conditions. In the state illustration in FIG. 4D, the devices connected via Adapter 16 are isolated from the remainder of the network and all neighbor notification messages or any other information provided by the Adapter 16 are still associated with devices connected to the ports which the microprocessor 17 controls.

Figure 5A:
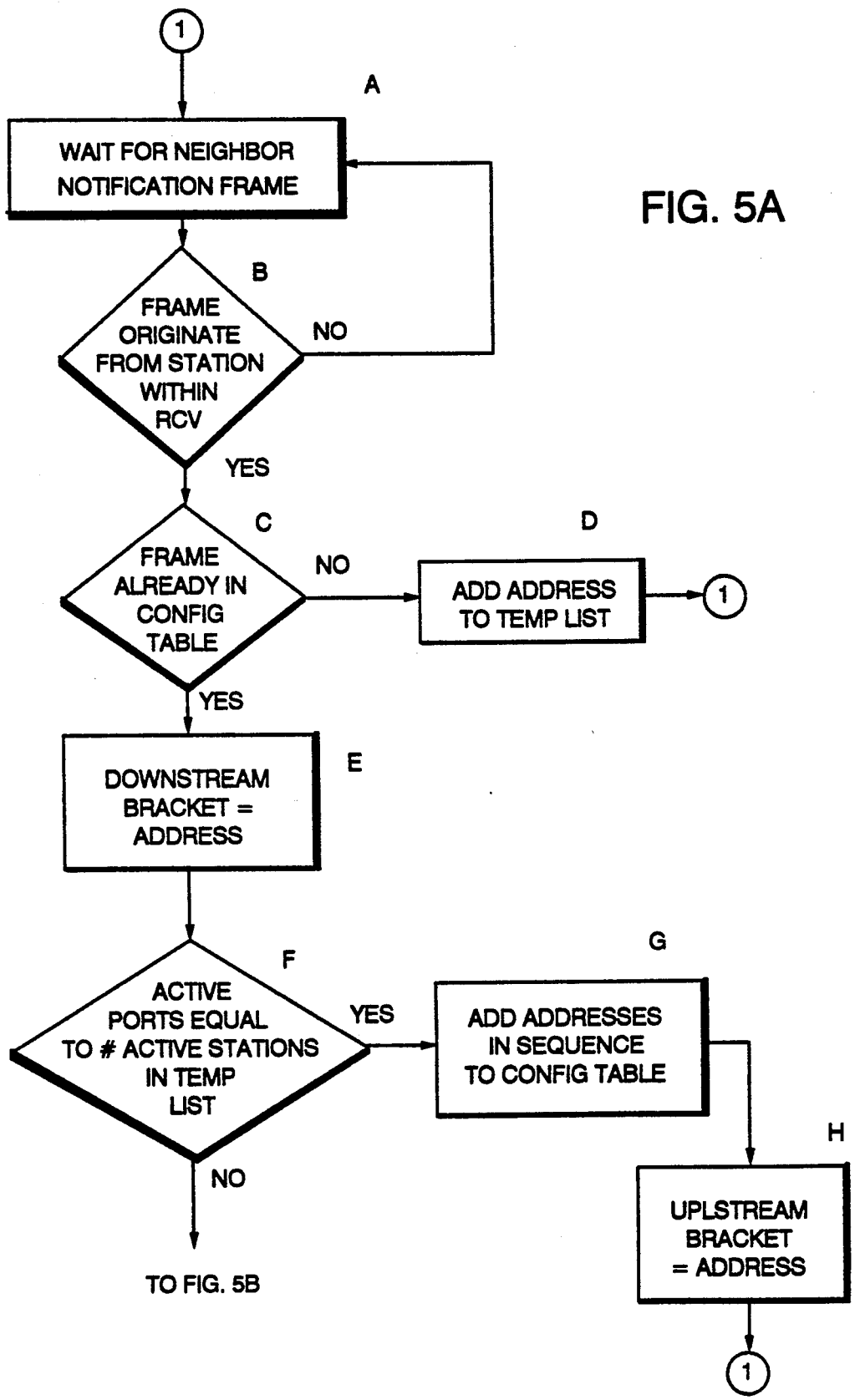
Figure 5C:
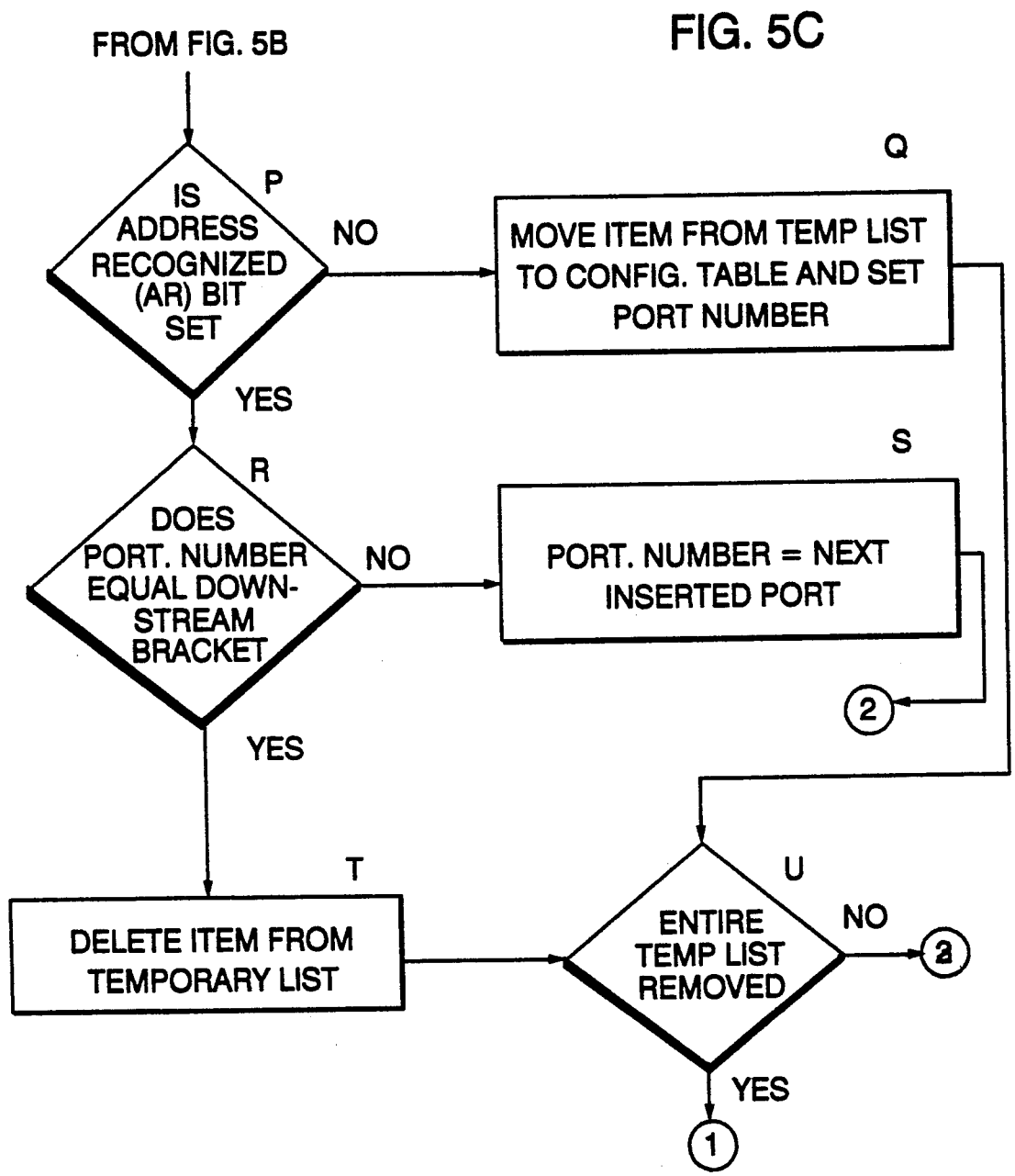

The flow diagrams illustrated in FIGS. 5A, 5B and 5C define the program module which correlates the ports to the specific stations connected to the ports. The program creates tables which identify the specific port to which each station is connected, without any additional equipment or specific reporting by the connected devices.

The program maintains the three tables listed below, which are relevant to the modules illustrated in FIGS. 5A, 5B and 5C.
1. Port Table
2. Attachment Module (AM) Table
3. Config Table The Port Table includes the status (active/inactive) of each of the RCUs eighty ports, and is maintained by monitoring the DC current provided by the stations wanting access to the network. In the absence of any unique requirements, the microprocessor 17 will enable all of the ports, and presence of the DC current from a station will insert the port into the series circuit. This insertion is reported to the program via Bus 18 (FIG. 3), which marks the port as active in the Port Table. If the DC current is removed, the port is bypassed and the corresponding entry for that port in the table is marked inactive. The AM Table is similar and includes the status (active/inactive) for each of the four attachment modules which are under control of the microprocessor 17 as previously described. Both of these tables are updated every 64 milliseconds.

The program also maintains a Config Table, which lists all stations connected to the network and the ports to which they are attached.

FIGS. 5A, 5B and 5C are flowcharts of the program module which builds the Config Table, using neighbor notification frames. As previously described, the neighbor notification frame includes the address or identity of the source, and the address or identity of the Nearest Active Upstream Neighbor Station (NAUN); however, it does not include information about the port where this station connects.

The RCU is configured such that one of its three adapters is located upstream of all ring stations, and one of its adapters is downstream from all stations. These adapters are referred to as the "Ring In" (RI) and "Ring Out" (RO) adapters, respectively. The Ring Out adapter (Adapter 15 under normal circumstances) provides the microprocessor 17 with a copy of each neighbor notification frame sent out on the token ring. The program module starts at entry point 1 of FIG. 5A and examines copies of neighbor notification frames received over the bus 19 (FIG. 3).

Because the Ring In and Ring Out adapters effectively bracket all stations on the RCU, it is possible to determine whether a neighbor notification frame has originated from a station within the RCU or not. Once the neighbor notification frame is received from the Ring In adapter, all subsequent frames received until the Ring Out adapter's Neighbor Notification frame have been sent from stations with the RCU. This knowledge allows the program to ignore all frames sent from stations outside the RCU (FIGS. 5A, Block B).

Having established that a Neighbor Notification frame originated from a station on the RCU, the program searches through the current Config Table to determine whether this station's port has already been determined. If the address is not found in the Config Table, Block C (i.e., this is a new station), its address is placed into a temporary list (FIG. 5A, Block D). This temporary list is used later to correlate active ports with station addresses.

If the port number is already known, the originating station is used as a bracket in determining the location of newly inserted stations (FIG. 5A, Block E). After setting this station up to be a bracket, we insert any stations already into the temporary list into the Config Table. There are two ways this is accomplished. If the number of stations in the temporary list is equal to the number of active ports between the upstream and downstream bracket (FIG. 5A, Block F), then there is a direct mapping of the station addresses to the active ports (FIG. 5A, Block G). If the number of active ports does not match the number of stations in the list, the Mismatch Resolution routine must be executed (FIGS. 5B and 5C, Block I-Block U). A thorough discussion of this routine and an example follow.

The function of the Mismatch Resolution routine is to take a known station address and match it to an active port. The Mismatch Resolution routine begins by physically wrapping out (i.e. deactivating) the upstream bracket's port (Blocks I through O). This will prevent any and all stations connected to the port from entering the ring. Thus, no station on the deactivated port will be able to set the AR bit of any frame addressed to it.

Once a port has been wrapped out, the Mismatch Resolution routine instructs the microprocessor 17 or some other addressable network unit to send a frame to the target address (i.e. the address whose port connection is unknown). If the frame returns with the Address Recognized (AR) bit not set, then the station is on the deactivated port. The port is unwrapped, and the station is moved from the temporary list to the Config Table (FIG. 5C, Block Q). If the Address Recognized bit is set, then the station is not connected to the wrapped port, so the wrapped port is unwrapped and Mismatch Resolution continues by wrapping the next active port. This continues until either the adapter is found or the downstream bracket is reached. If the address is not found, the station is deleted from the temporary list (FIG. 5, Block S). This process is repeated until all stations in the temporary list have been resolved (FIG. 5C, Block U).

Figure 7:
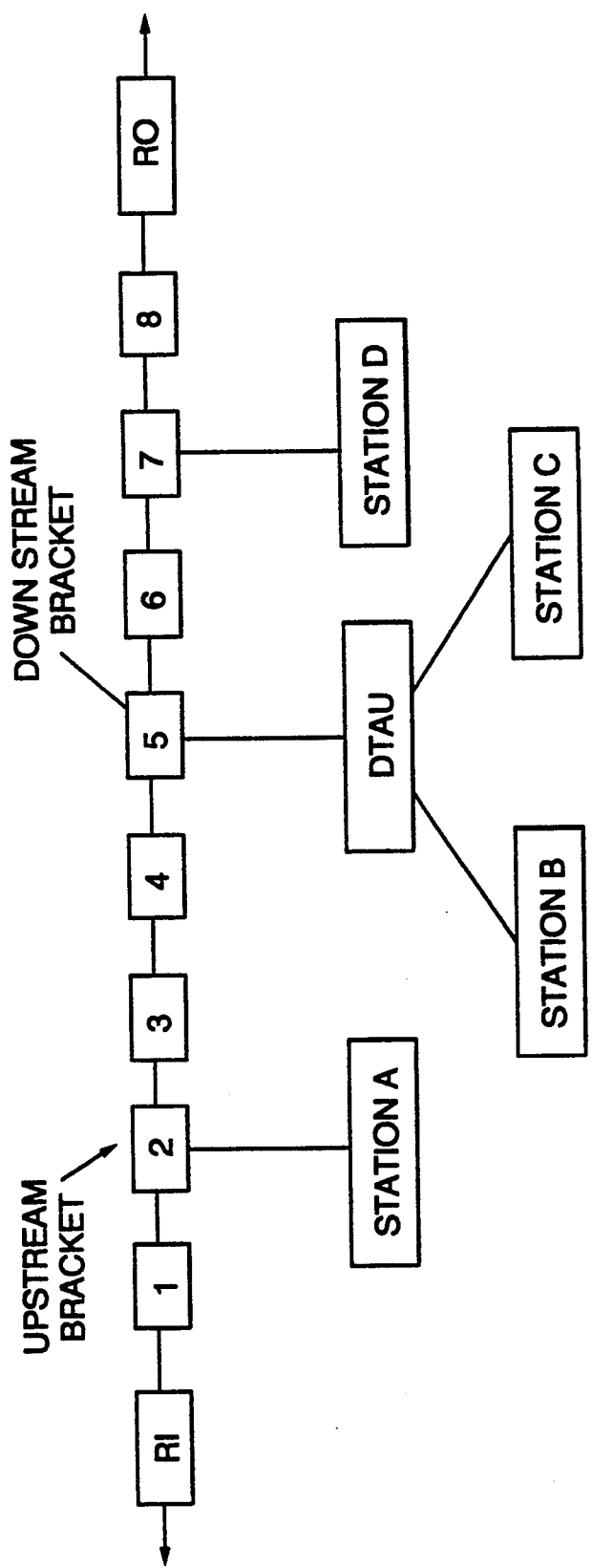
FIG. 7 is a graphical representation of a sector of a communications network, provided to support an example of the usage of the invention.

An example of how this program works will now be given. FIG. 7 shows a segment of a communications network coupled to one of the RCUs (FIG. 1) and bracketed by network addressable units (adapters) Ring In (RI) and Ring Out (RO). It is assumed that in this segment of the network, eight ports, numbered one through eight, are provided. In addition, four stations with addresses A, B, C, and D are connected to Port 2, Port 5, and Port 7, respectively. Port 5 is able to support two stations (B, C) because of a splitter (DTAU) to which Stations B and C are connected.

The Port Table would be similar to Table II below, containing the current status (active/inactive) of each of the eight ports. In the Table II, "0" represents an inactive port and "1" represents an active port. The goal of the Mismatch Resolution Routine would be a table resembling Table I, mapping each of the RCU's active ports to a list of addresses. Assume for this example that the first time through the Neighbor Notification, there were only three active stations (A, C, D), and three active ports (2, 5, 7). It would be simple to map each of these stations to the port in which it is inserted (i.e., A is in port 2, C is in port 5, and D is in port 7). Suppose that during the next notification cycle, a fourth station (B) also participated. Since there are still only 3 active ports, the Mismatch Resolution routine would be activated to determine the location of station B. Because station B sent its frame after station A but before station C, the Mismatch algorithm would set up A as the upstream bracket, and C as the downstream bracket (FIG. 7). The first step taken by the routine would be to wrap out port 2 (the upstream bracket's port) and send a frame to station B. Because B is on port 5, it will set the Address Recognized bit in the frame. This indicates to the program that station B is not on port 2. Therefore, the program activates port 2 and deactivates port 5 (the next inserted port). The frame is again addressed to station B and sent out on the ring. Because station B is attached to port 5 (which is now deactivated), it cannot set the AR bit in the frame. This indicates to the microprocessor 17 that station B is attached to the ring via port 5. Port 5 is activated, and station B is moved from the temporary list to the Config Table, mapped to port 5.

TABLE I

| Config Table | |
|---|---|
| PORT # | ADDRS. |
| 1 | |
| 2 | A |
| 3 | |
| 4 | |
| 5 | B, C |
| 6 | |
| 7 | D |
| 8 | |

TABLE II

| Port Table | | | | | | | |
|---|---|---|---|---|---|---|---|
| 0 | 1 | 0 | 0 | 1 | 0 | 1 | 0 |

While the invention has been particularly shown and described with reference to preferred embodiments thereof, it will be understood by those skilled in the art that various changes in form and details may be made therein without departing from the spirit and scope of the invention.

Having thus described the invention, what we claim as new and desire to secure by letters patent is:

1. A device for connecting to a serial communications network and for generating a topology map of stations connected to said network comprising:
   network addressable means for interconnecting the device to the serial network;
   a plurality of communications ports disposed between the network addressable means; each one of the communications ports coupled to at least one station and responsive to a signal generated by the at least one station to insert said at least one station into the network;
   a first means for monitoring each port and for generating a histogram table representative of whether each port is in an on-state, active, or an off-state, inactive;
   a second means for receiving messages containing an identifier of the source from which it originates and generated in sequence by the network addressable means and all active stations;
   said second means correlating the identifier in each message with the histogram table to indicate the active ports with attached single station and the active ports with attached multiple stations.

2. The device of claim 1 wherein the network addressable means includes at least two communications adapters, each having a unique identifier and operable for transmitting and receiving informational signals, including the unique identifier to and from the network.

3. The device of claim 1 wherein the first means include a multibit register; and circuitry for controlling the state of each bit to reflect if each of the ports is in an on-state or is in an off-state.

4. The device of claim 2 wherein the second means include a microprocessor programmed to (i) disable the ports sequentially; (ii) generating and transmitting to a target station a message including the target stations address and an Address Recognize indicator bit; (iii) receiving in said microprocessor a returned message; (iv) examining the Address Recognize indicator bit, if the Address Recognize indicator bit is set to a predetermined state repeat (i)–(iv) until a returned frame is received with the Address Recognized indicator bit not set to the predetermined state, and flag the last disabled port as the one to which multiple stations are connected.

5. The device of claim 1 wherein the first means includes a microprocessor responsive to signals provided by to a port station wanting access to the network; said microprocessor allocating an indicator for said port and adjusting the state of the indicator in accordance with the presence or absence of said signals.

6. The device of claim 5 where the indicator allocated for the port is set to an "on" state when a signal to said port is present and the indicator is set to an "off" state when the signal to said port is not present.

7. A device for connecting to a serial communications network and for generating a topology map of stations connected to said network comprising:
   network addressable means for interconnecting the device to the serial network;
   a plurality of communications ports disposed between the network addressable means; each one of the communications ports coupled to at least one station and responsive to a signal generated by the at least one station to insert said at least one station into the network;
   a first means for monitoring each port and for generating a histogram table representative of whether each port is in an on-state, active, or in an off-state, inactive; a second means for receiving messages containing an identifier of the source from which it originates and generated in sequence by the network addressable means and all active stations;
   said second means correlating the identifier in each message with the histogram table to indicate the active port to which multiple stations are connected.

8. A method for generating network topology information in a serial communications network, which includes a plurality of serially connected access ports each suitable for attaching a data transmission station having a unique network identity to the serial network, a pair of communications adapters each having a unique network identity bracketing said access ports in the serial network, and in which each active data station and the adapters at given times transmit in the order they are connected to the serial network, a first message on the network which includes their network identifiers and means responsive to insertion signals provide by an active station for connecting the stations to the network comprising the steps of:

(a) in response to the insertion signals generating a first port table which includes active/inactive status of each port;

(b) in response to sequential first messages received between the first messages from the pair of communications adapters, correlating an identity of a station in each sequential first message with an active port in said port table;

(c) if the number of identifiers representative of active stations and the number of active ports are unequal, (i) disable the ports sequentially; (ii) generating and transmitting to a target station a message which include an identifier for the target station and Address Recognized (AR) indicators set to a first state; (iii) receiving the message at a source from which it has been transmitted; (iv) examining the Address Recognized indicator and correlating the identifier for the target station with a last disabled port if the Address Recognized indicator is set to the first state.

9. The method of claim 8 further including the steps of (d) if the Address Recognized indicator in a returned message is set to a second state, repeat (i) through (iv) until a returned message with the Address Recognized indicator set to the first state is received and (vi) correlating the identifier for the target station with the last disabled port.

10. A device for connecting to a communications network and for generating a topology map of stations connected to said network comprising:

network addressable adapters for interconnecting the device to the serial network;

a plurality of communications ports disposed between the network addressable adapters; each one of the communications ports to be coupled to at least one station and responsive to a signal generated by the at least one station to insert said at least one station into the network;

a first means for monitoring each port and for generating a histogram table representative of on-electrical state, active, and off-electrical state, inactive, of each port;

a second means for receiving messages containing an identifier of the source from which it originates and generated in sequence by the network addressable means and all active stations;

said second means correlating the identifier in each message with the histogram table to indicate the active ports with attached single station and the active ports with attached multiple stations.

* * * * *